US005524725A

United States Patent [19]
Schantzen

[11] Patent Number: 5,524,725
[45] Date of Patent: Jun. 11, 1996

[54] AUTOMATIC CHAIN TENSION ADJUSTOR

[75] Inventor: Wayne G. Schantzen, Thief River Falls, Minn.

[73] Assignee: Arctco, Inc., Thief River Falls, Minn.

[21] Appl. No.: 269,668

[22] Filed: Jul. 1, 1994

[51] Int. Cl.⁶ .................................. F16H 7/12; F16H 7/18
[52] U.S. Cl. .......................... 180/190; 180/182; 180/231; 474/111; 474/133
[58] Field of Search .................................. 180/190, 231, 180/182; 474/101, 111, 133

[56] References Cited

U.S. PATENT DOCUMENTS

| | | | |
|---|---|---|---|
| 3,673,884 | 7/1972 | Southiere | 474/111 |
| 4,472,161 | 9/1984 | Ojima | 474/111 |
| 4,583,962 | 4/1986 | Bytzek et al. | 474/133 |

OTHER PUBLICATIONS

Arctco "1992 Arctic Cat Snowmobile Illustrated Parts Manual Wildcat" Printed Nov. 1991 p. 5.
"1988–1989 Clymer Arctic Cat Snowmobile Shop Manual" pp. 311 and 306.
"Arctco 1992 Arctic Cat Snowmobile Wildcat 700 Operator's Manual" Printed Aug. 1991 pp. 9 and 17.

*Primary Examiner*—Mitchell J. Hill

[57] ABSTRACT

A chain drive which has an automatic chain tension adjustor. The chain adjustor has a housing cover with a cover head suitable for being turned with a ratchet for transferring torque to an adjacent motor spring. The motor spring is connected to a shaft within a chain adjustor screw housing. A chain adjustor screw within the shaft is urged by the motor spring through the shaft and housing against the chain adjustor arm. The arm pushes the chain and reduces slack in the chain.

3 Claims, 6 Drawing Sheets

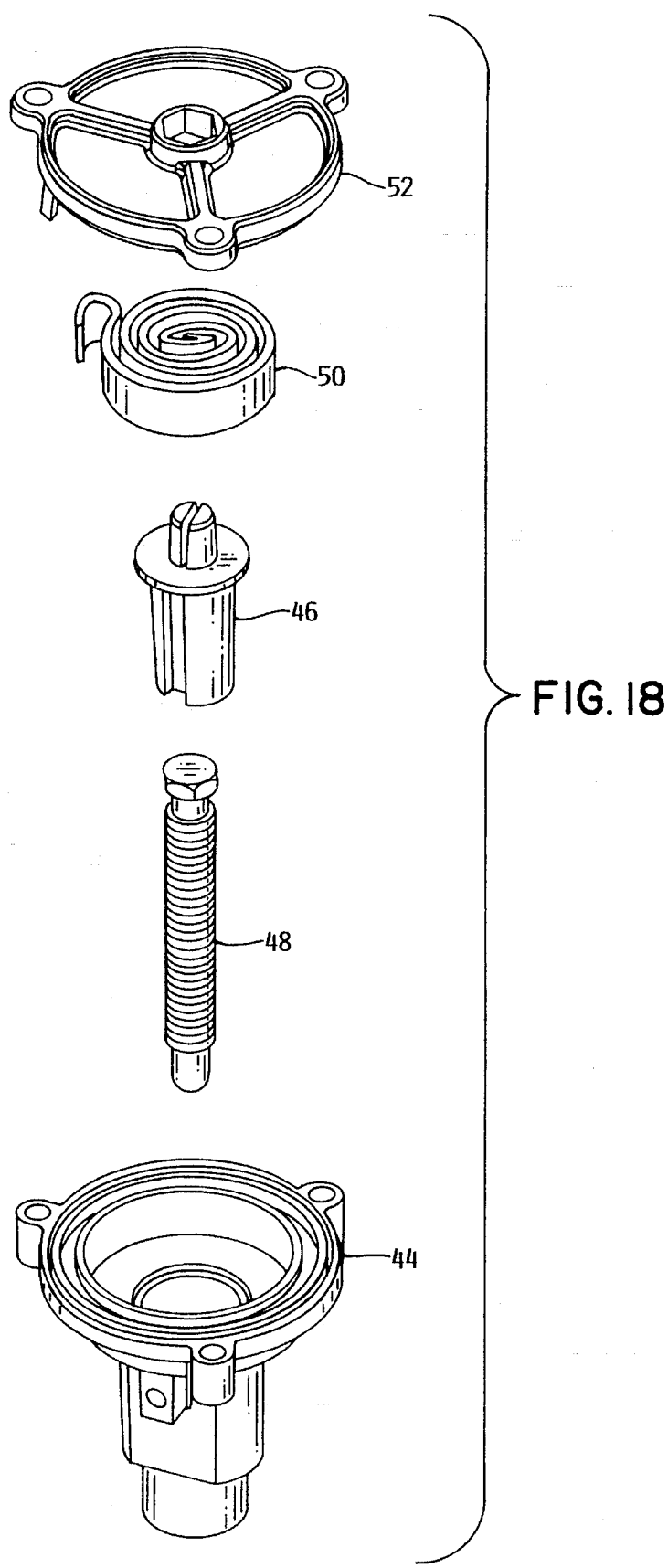

1

AUTOMATIC CHAIN TENSION ADJUSTOR

BACKGROUND

The present invention relates to an apparatus and method for a chain drive which is capable of automatically maintaining chain tension as needed with an automatic chain adjustor.

Conventional chain drives can encounter chain jumping when the chain loosens up. The chain can become loose for a number of reasons over time. For example, the chain can loosen from wear of a steel chain on steel gears. Pins can wear down. As a chain wears down the chain gets longer and requires an adjustment to take up the slack. Otherwise, an improperly adjusted chain can start jumping on the sprocket and possibly tear the teeth of the sprocket off. An example of how chain drives are currently adjusted can be seen in snowmobiles. A manually adjusted chain tension system may normally require loosening a jam nut and screw in the adjustor by hand. Although, in general, these devices have performed satisfactorily, those devices would benefit from greater ease of use.

Accordingly, it is the object of the present invention to provide an apparatus and method for automatically adjusting chain tension that improves upon or overcomes some of those disadvantages of currently used systems and methods.

SUMMARY

The present invention provides an apparatus and method for automatically adjusting chain tension to overcome the problems and satisfy the needs previously considered. It is an advantage of this invention to provide an apparatus and method for extending the chain life of a chain drive. Another advantage is that as more horsepower is added to a chain drive system, and as the chain lengthens over time, the apparatus can automatically reduce slack in the chain as needed. Still another advantage of this apparatus and method is the capability of it working on both forward only and reverse capable chain drive systems.

It is a feature of this invention to have an apparatus for automatically adjusting chain tension comprising a chain drive with at least two axles, two sprockets and a chain enmeshed with the sprockets; a chain adjustor arm mounted adjacent to the chain; chain adjustor screw housing positioned adjacent to the arm; a chain adjustor shaft disposed within the housing; a chain adjustor screw disposed within the shaft and adjacent to the arm; means for biasing the screw against the arm for urging the arm against the chain; and an adjustor housing cover mounted on the housing for supporting the biasing means and for tightening the biasing means.

More particularly, the apparatus further comprises a chain case adjacent to but not touching the chain for support of the housing. The apparatus for automatically adjusting chain tension can be useful in a variety of applications, such as, in a snowmobile, an all-terrain vehicle, a motorcycle and a bicycle.

Other objects and advantages of the present invention will be apparent and understood from the following detailed description when taken in conjunction with the accompanying drawings.

BRIEF DESCRIPTION OF THE DRAWINGS

An automatic chain tightening adjustor system constructed in accordance with this invention is described hereinbelow with reference to accompanying drawings, wherein;

FIG. 18 is an exploded perspective assembly drawing of the adjustor screw assembly.

DETAILED DESCRIPTION OF THE INVENTION

Figure 1:
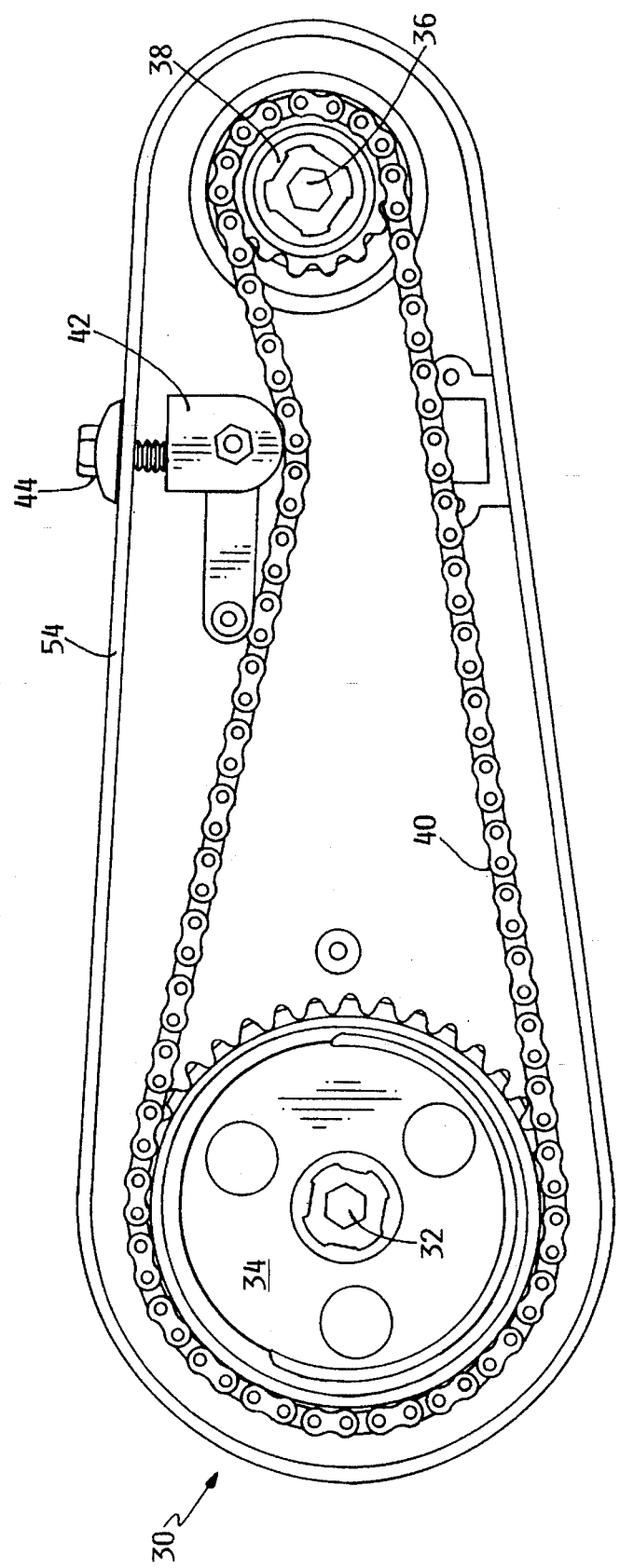
FIG. 1 is a front elevational view of a snowmobile chain drive with some parts cut away and some eliminated.

Referring now to the drawings, wherein like reference numerals designate like or corresponding parts throughout the several views, FIG. 1 illustrates a preferred embodiment within a snowmobile. Major snowmobile components include but are not limited to a forwardly mounted engine, a steering system, a seat area, a traction unit, chassis, front suspension system, a drive train system, and a chain drive.

DRIVE TRAIN SYSTEM

The drive train system on a snowmobile may include, but is not limited to a crankshaft, a drive clutch, drive belt driven clutch, a jack shaft 36, a caliper brake, a chaincase 54, and a drive axle 32. For orientation, the drive train system is located in front of the seat area and traction unit. Also, the drive system is within the chassis in between and behind the front suspension system.

The drive clutch is connected to the engine by the crankshaft. The driven clutch is connected to the drive clutch by a drive belt. A jack shaft 36 extends through the driven clutch, the caliper brake, and a jack shaft sprocket 38 inside a chaincase 54. Below the jack shaft sprocket 38, inside the chaincase 54 is a larger drive axle sprocket 34. Within the chaincase 54 is a chain 40 that connects the jack shaft sprocket 38 with the drive axle sprocket 34 inside the chaincase 54. Below and parallel to the jack shaft 36 is a drive axle 32. The drive axle 32 extends from the drive axle sprocket 34 through the front end of the traction unit over to the left side of the snowmobile chassis. A drive wheel fixed to the middle portion of the drive axle 32 engages and enmeshes the track rubber pegs which are integral with the center portion of the track tread.

The apparatus for automatically adjusting chain tension comprises a chain drive 30, an adjustor arm 42, an adjustor screw housing 44, an adjustor shaft 46, an adjustor screw 48, spring 50 for urging the adjustor screw 48 against the adjustor arm 42 and an adjustor housing cover 52. This chain adjustor helps to increase the working life of a chain drive 30 by a significant period of time beyond those of the prior art which require manual adjustment that is sometimes neglected to be done.

A chain drive 30 of a snowmobile includes a drive axle 32, a drive axle sprocket 34, a jack shaft 36, a jack shaft sprocket 38 and a chain 40. The drive axle sprocket 34 is attached to the drive axle 32. The jack shaft sprocket 38 is attached to the jack shaft 36. A chain 40 enmeshes with the drive axle sprocket 34 and the jack shaft sprocket 38. Power is transferred from the jack shaft 36 to the drive axle 32 by means of the chain 40.

An adjustor arm 42 is located adjacent to the chain 40. To eliminate chain slack, the adjustor arm 42 is pressed against the chain 40 with sufficient force so as to enmesh the chain 40 against the periphery of both sprockets 34 and 38 and in between the teeth of both sprockets 34 and 38. Often an adjustor arm 42 will contain a roller which is a primary point of contact between the adjustor arm 42 and the chain 40.

Figure 2:
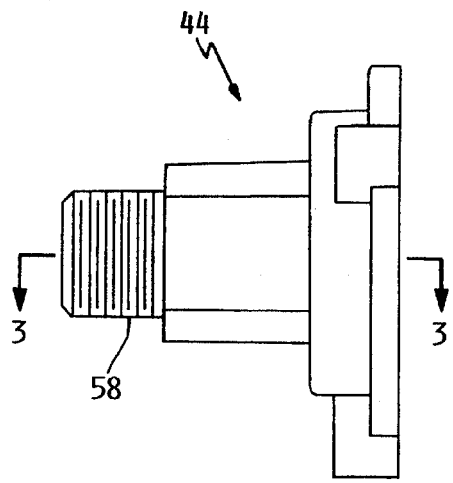
FIG. 2 is a side elevational view of an adjustor screw housing showing an externally threaded surface.
Figure 3:
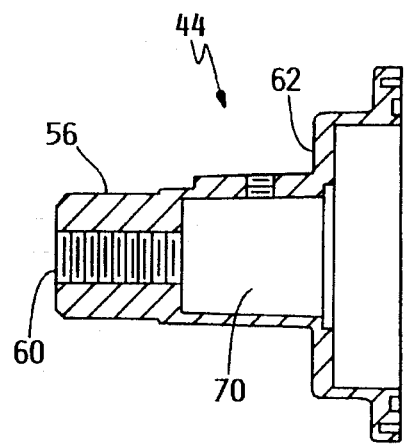
FIG. 3 shows a side elevational cross-section of the adjustor screw housing taken on the Line 3—3 of FIG. 2 looking in the direction of the arrows.
Figure 4:
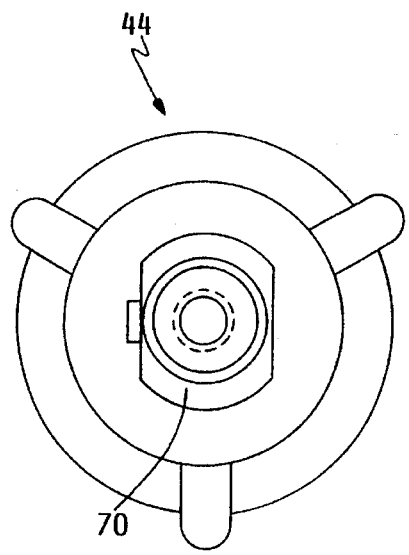
FIG. 4 shows a side elevational view of the first end of the adjustor screw housing.
Figure 5:
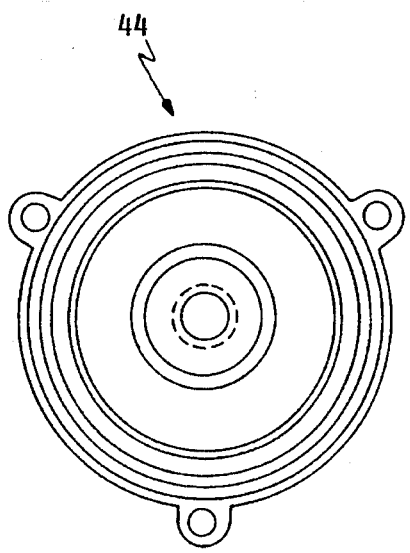
FIG. 5 shows a side elevational view of the second end of the adjustor screw housing.

An adjustor screw housing 44 is positioned adjacent to the adjustor arm 42. (FIGS. 2–5.) The adjustor screw housing 44 is made of aluminum. The adjustor screw housing 44 supports and provides a threaded chamber for an adjustor screw 48. (FIGS. 2–5.) The adjustor screw housing 44 has a funnel-like shape with the first end 56 smaller than the second end 62. (FIG. 3.) The first end 56 of the adjustor screw housing 44 has an externally threaded surface 58 as shown in FIG. 2 and an internally threaded chamber 60 as shown in FIG. 3. The externally threaded surface 58 screws into an aperture in the chaincase 54. An adjustor screw 48 fits through the internally threaded chamber 60 of the adjustor screw housing 44 and ultimately contacts an adjustor arm 42. In the interior of the mid-section of the adjustor screw housing 44 is a shaft aperture 70 shaped like a cylinder to accommodate the adjustor shaft 46.

Figure 9:
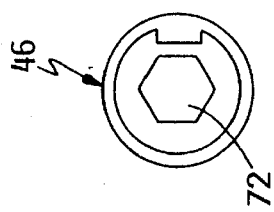
FIG. 9 is a side elevational view of the head retainer of the adjustor shaft.
Figure 12:
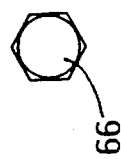
FIG. 12 shows the head of an adjustor screw.
Figure 8:
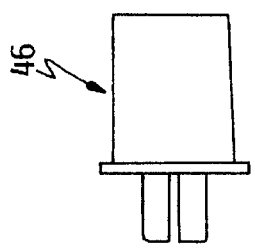
FIG. 8 is another side elevational view of the adjustor shaft.
Figure 7:
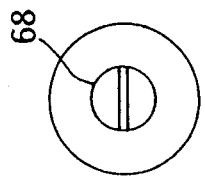
FIG. 7 is a side elevational view of the split end of the adjustor shaft.

An adjustor shaft 46 is disposed within the adjustor screw housing 44. (FIGS. 6–10.) The adjustor shaft 46 is made of zinc material in a preferred embodiment of the invention. The adjustor shaft 46 has a head retainer 64 and a split end 68. The interior of the head retainer 64 is shaped as a head retainer aperture 72 for receiving a hexagonal shaped head 66 of the adjustor screw 48. (FIGS. 9 and 12.) At the other end of the adjustor shaft 46 is the split end 68 for securing the spring retainer end 82 of a flat motor spring 50. The head retainer 64 of the adjustor shaft 46 fits into the shaft aperture 70 in the interior of the adjustor screw housing 44.

Figure 11:
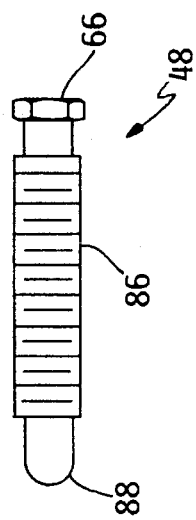
FIG. 11 is a side elevational view of an adjustor screw.
Figure 6:
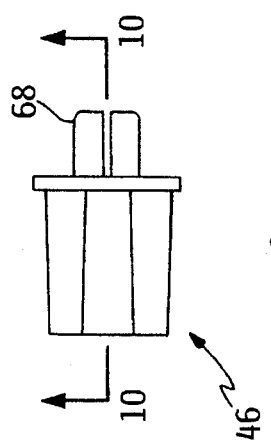
FIG. 6 shows a side elevational view of an adjustor shaft.
Figure 10:
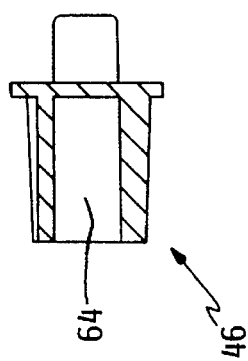
FIG. 10 shows a side elevational cross-section of the adjustor shaft taken on the Line 10—10 of FIG. 6 looking in the direction of the arrows.

An adjustor screw 48 is disposed within the adjustor shaft 46 and adjacent to the adjustor arm 42. (FIGS. 11–12.) The adjustor screw 48 is made of steel with a hexagon-shaped head and a rounded and unthreaded tip 88. A threaded body 86 extends over the vast majority of the shaft of the adjustor screw 48.

Figure 15:
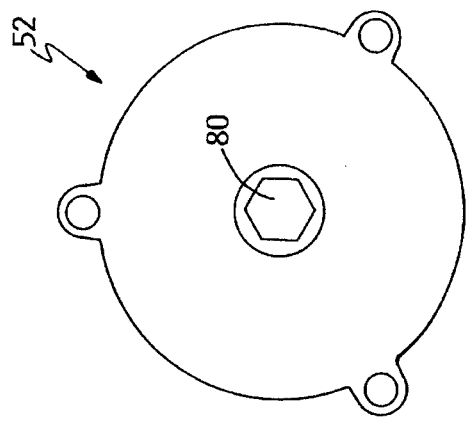
FIG. 15 shows an exterior view of an adjustor housing cover.
Figure 17:
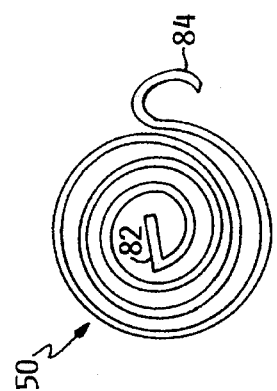
FIG. 17 shows the top plan view of the spring.
Figure 16:
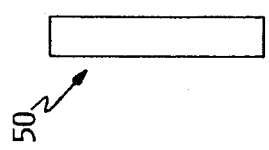
FIG. 16 is a side elevational view of a spring.

Spring 50 for biasing the adjustor screw 48 against the adjustor arm 42 for urging the adjustor arm 42 against the chain 40 is shown in FIGS. 16–17. A preferred embodiment of the spring 50 is a flat motor spring having a spring retainer end 82 and a tension peg end 84. The spring tension can be increased when the spring retainer end 82 is secured to and held stationary by the split end 68 of the adjustor shaft 46 and while a cover tension peg 74 moves the tension peg end 84 in a circular path around the center peg 76 of the housing cover 52. (FIGS. 13–17).

Figure 14:
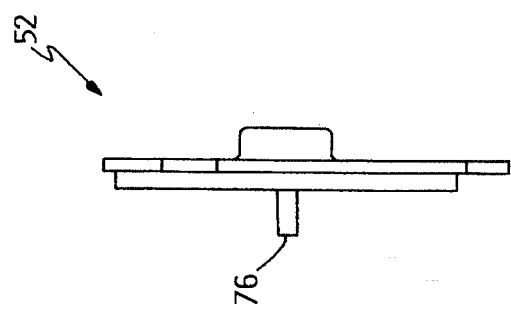
FIG. 14 shows a side elevational view of an adjustor housing cover.
Figure 13:
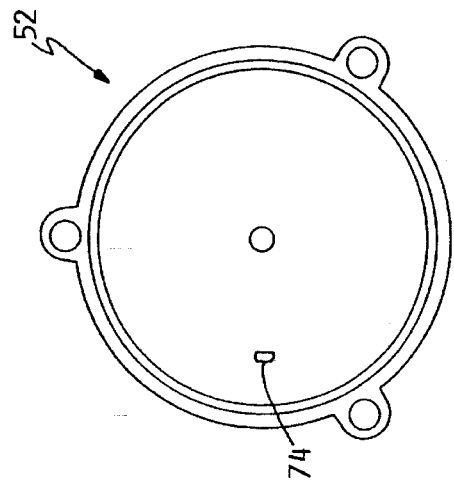
FIG. 13 shows the interior of an adjustor housing cover.
Figure 19:
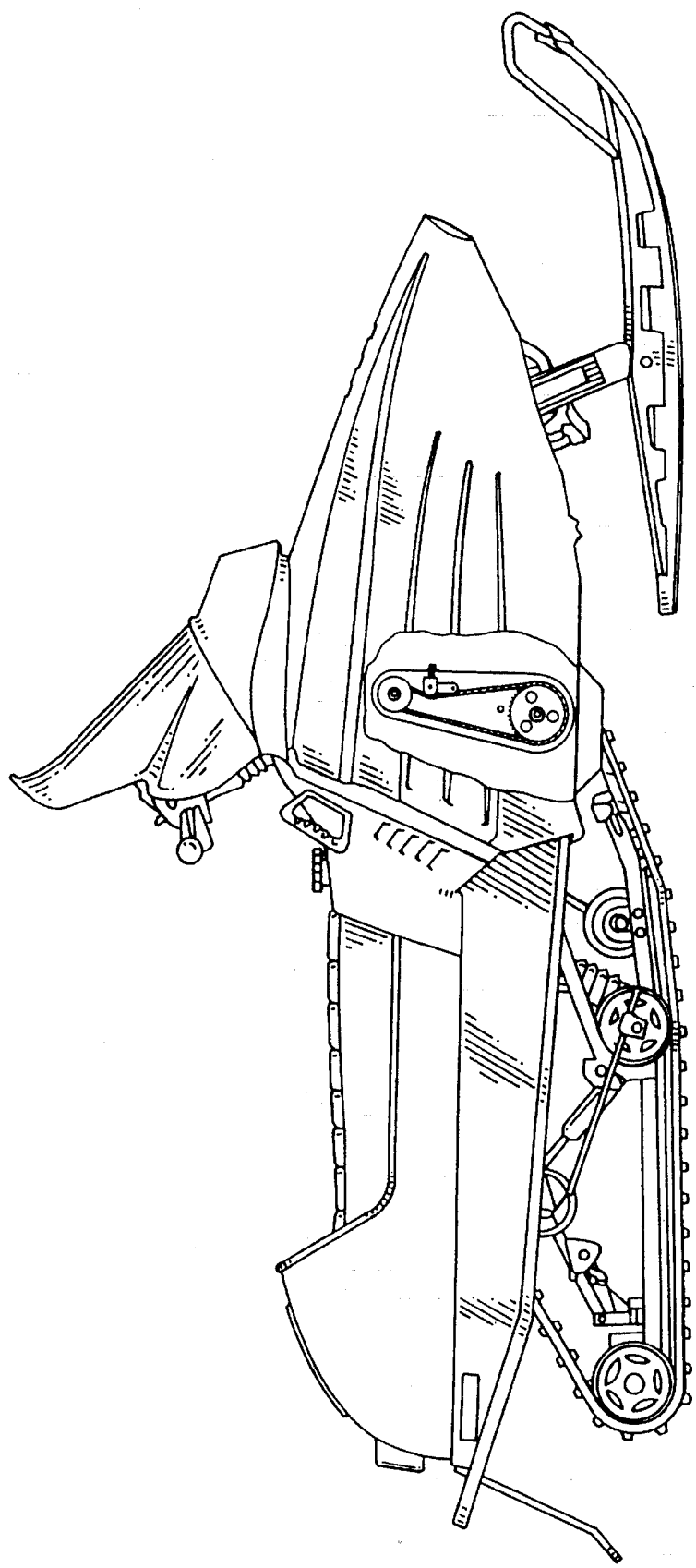
FIG. 19 illustrates placement of the automatic chain tension adjustor in a snowmobile.

An adjustor housing cover 52 is mounted on the adjustor screw housing 44 for supporting and tightening the spring 50. (FIGS. 13–15.) The adjustor housing cover 52 is essentially disk shaped with a center peg 76 in the center and a cover tension peg 74 off center on the interior of the adjustor housing cover 52. On the exterior of the adjustor housing cover 52 is a cover head 80, hexagonal in shape, at the center of the adjustor housing cover 52 which is suitable for wrenching by ratchet. At the periphery of the adjustor housing cover 52 are several cover hole apertures for securing the adjustor housing cover 52 to the adjustor screw housing 44.

In operation, when torque is transmitted from the rotating cover head 80 of the adjustor housing cover 52 to the spring 50, the adjustor screw 48 is urged through the internally threaded chamber 60 against the adjustor arm 42. The adjustor screw 48 forces the adjustor arm 42 against the chain 40 to such an extent as to reduce slack around the sprockets 34 and 38.

Accordingly, with the present invention, the need for periodic manual chain drive adjustment has been reduced, if not eliminated. It should be understood, of course, that the foregoing disclosure fully describes only a preferred embodiment of the invention in a snowmobile, but that the invention is equally usable in an all-terrain vehicle, a motorcycle, or a bicycle, and that numerous modifications or alterations may be made therein without departing from the spirit and the scope of the invention as set forth in the appended claims. Spring 50, for example, includes other types of springs, weights, or electrically powered alternatives.

I claim:

1. An apparatus for automatically adjusting chain tension in a vehicle, comprising:

a) a chain drive including
   a drive axle,
   a drive axle sprocket attached to the drive axle,
   a jack shaft,
   a jack shaft axle sprocket attached to the jack shaft, and
   a chain enmeshed with the drive axle sprocket and the jack shaft axle sprocket;

b) an adjustor arm mounted adjacent to the chain;

c) an adjustor screw housing positioned adjacent to the adjustor arm;

d) an adjustor shaft disposed within the adjustor screw housing;

e) an adjustor screw disposed within the adjustor shaft and adjacent to the adjustor arm, the adjustor screw and the adjustor shaft cooperating to rotate as a unit;

f) a spring engaged with the adjustor shaft to rotate the adjustor screw against the adjustor arm for urging the adjustor arm against the chain;

g) an adjustor housing cover having a cover tension peg to cooperate with the spring in rotating the adjustor shaft; and h) the adjustor screw housing cover mounted on the adjustor housing for supporting the spring and for tightening the spring.

2. An apparatus as recited in claim 1, in a snowmobile.

3. A method of using an apparatus for automatically adjusting chain tension in a vehicle, comprising the steps of:
 a) providing a chain drive including
  a drive axle,
  a drive axle sprocket attached to the drive axle,
  a jack shaft,
  a jack shaft sprocket attached to the jack shaft,
  a chain enmeshed with the drive axle sprocket and the jack shaft sprocket, and
  a chaincase adjacent to said chain;
 b) providing an adjustor arm adjacent to the chain;
 c) providing an adjustor screw housing adjacent to the adjustor arm, said adjustor screw housing having a shaft aperture;
 d) providing an adjustor shaft having one split end and one head retainer aperture end;
 e) providing an adjustor screw disposed within the head retainer aperture end of the adjustor shaft, the adjustor screw and the adjustor shaft cooperating to rotate as a unit;
 f) inserting the adjustor shaft and the adjustor screw into the shaft aperture of the adjustor screw housing;
 g) providing a spring adjacent to the adjustor shaft, said spring having two ends;
 h) engaging the first end of said spring with the split end of the adjustor shaft;
 i) providing an adjustor housing cover having a cover tension peg;
 j) engaging the second end of said spring with the cover tension peg;
 k) tightening said spring by rotating said adjustor housing cover;
 l) mounting said adjustor housing cover on the adjustor screw housing; and
 m) attaching the adjustor screw housing to the chaincase; thereby automatically urging the adjustor screw through the shaft aperture of the adjustor screw housing and against the adjustor arm to maintain constant tension on the chain.

* * * * *